United States Patent [19]

Woodruff

[11] 4,130,001
[45] Dec. 19, 1978

[54] DRIVE COUPLER AND UNCOUPLER
[75] Inventor: Frank Woodruff, New Hartford, N.Y.
[73] Assignee: The Bendix Corporation, Teterboro, N.J.
[21] Appl. No.: 827,500
[22] Filed: Aug. 25, 1977
[51] Int. Cl.² .................. F16D 3/54; F16D 19/00; F16D 11/06
[52] U.S. Cl. .................................. 64/19; 64/12; 192/96; 192/71
[58] Field of Search ............... 64/19, 12; 403/DIG. 4, 403/91, 93; 192/71, 96

[56] References Cited
U.S. PATENT DOCUMENTS

| 829,525 | 8/1906 | Hill | 192/96 |
| 893,684 | 7/1908 | Whitcomb | 192/96 |
| 1,162,417 | 11/1915 | Tyler | 64/19 |
| 1,898,806 | 2/1933 | Baker | 64/19 |
| 2,086,549 | 7/1937 | Harris | 64/19 |
| 3,242,693 | 3/1966 | Paulsen | 64/19 |

Primary Examiner—Samuel Scott
Assistant Examiner—R. C. Turner
Attorney, Agent, or Firm—Anthony F. Cuoco

[57] ABSTRACT

A device is disclosed for coupling and uncoupling driving and driven members. The driving and driven members each include a flange and means are provided for engaging and disengaging said flanges. When the flanges are engaged, the members are coupled whereupon torque is transmitted from the driving to the driven member. When the flanges are disengaged, the members are uncoupled and the transmission of torque is prevented.

7 Claims, 3 Drawing Figures

DRIVE COUPLER AND UNCOUPLER

BACKGROUND OF THE INVENTION

1. Field of the Invention

This invention relates to a coupler and, more particularly, to a coupler for engaging and disengaging a driving shaft from a driven shaft.

2. Description of the Prior Art

In aircraft engines a powered drive shaft drives a generator shaft. In the event of a generator failure on a multi-engine aircraft, the engine driving the generator is shut off. However, a more desirable alternative is to provide means for uncoupling the failed generator from its driving engine so as not to affect engine operation. Various devices are known in the art for accomplishing this general purpose. Illustrative of these prior art devices are commonly assigned U.S. Pat. No. 2,989,160, issued June 20, 1961 to Frank Woodruff, disclosing a coupling device wherein brake means must be actuated to uncouple the driving and driven members and to prevent the transmission of torque; and commonly assigned U.S. Pat. No. 3,080,030, issued Mar. 5, 1963 to Henry Troeger, disclosing pneumatic valves for controlling pressurized air to couple and uncouple the driving and driven members. These devices, while adequate for specific purposes, do not fulfill the needs of the present invention, where a more economical and simpler device is required.

SUMMARY OF THE INVENTION

This invention contemplates a drive coupler and uncoupler for the purposes described and including a flange affixed to a driving member and another flange affixed to a driven member. The flange affixed to the driven member carries a pair of pivots for pivotally supporting a corresponding pair of plates. A rod is arranged to engage the plates and the plates are arranged to engage the flange of the driving member. The members are thus coupled and torque is transmitted from the driving member to the driven member as long as the plates are engaged with the flange of the driving member. Moments are generated so that upon displacement of the rod to disengage the rod from the plates, the plates pivot and are disengaged from said flange whereupon the driving and driven members are uncoupled.

The main object of this invention is to provide means for coupling driving and driven members whereby torque is transmitted from the driving to the driven member, and for uncoupling said members to prevent transmission of torque as may be required.

Another object of this invention is to accomplish the above with simpler and more economical means than has heretofore been possible.

Another object of this invention is to uncouple a generator from its driving engine without shutting off the engine.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
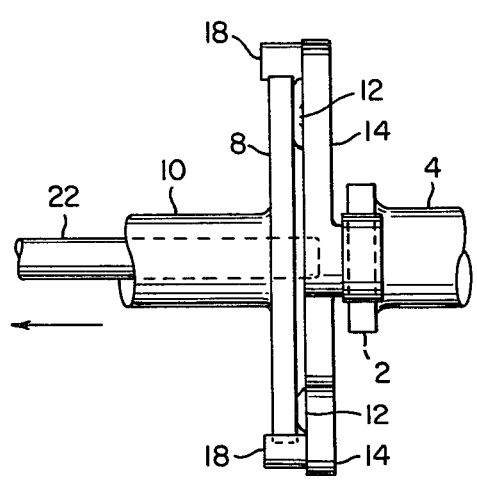
FIG. 1 is a side view of the device of the invention.
Figure 2:
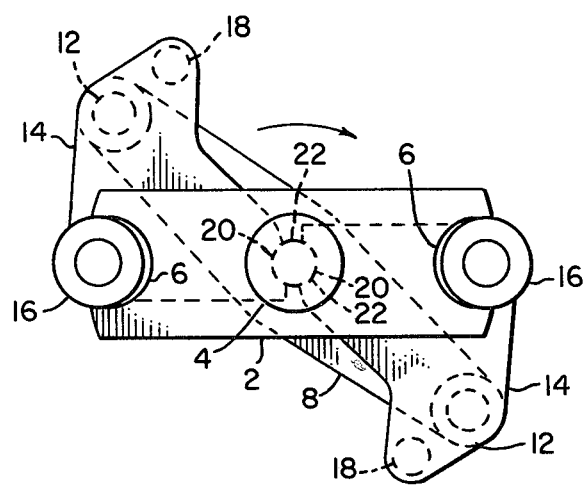
FIG. 2 is a right end view, relative to FIG. 1, showing the device in the engaged mode, i.e., when the driving and driven members are coupled.
Figure 3:
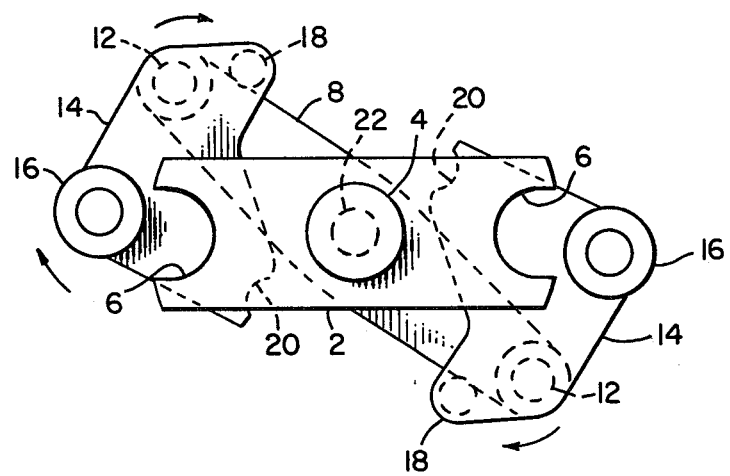
FIG. 3 is an end view, relative to FIG. 1, showing the device in a disengaged mode, i.e., when the driving and driven members are uncoupled.

With reference to FIGS. 1, 2 and 3, wherein corresponding elements carry corresponding numerical designations, a substantially oblong flange 2 is integral with or permanently affixed to a driving shaft 4. Flange 2 has a pair of substantially circular slots 6 at opposite ends thereof as best shown in FIGS. 2 and 3.

A substantially oblong flange 8 is integral with or permanently affixed to a hollow driven shaft 10. Flange 8 carries a pair of pivots 12 at opposite ends thereof.

Each of a pair of substantially triangular plates 14 are supported at corresponding corners by a pivot 12. Plates 14 carry rollers 16 at corners opposite the corners supported by the pivots and carry stops 18 near the pivot corners. Rollers 16 engage corresponding slots 6 of flange 2. Plates 14 have concavities 20 at corners opposite rollers 16. A longitudinally displaceable rod 22 extends through hollow shaft 10 and engages concavities 20 in plates 14.

Shaft rotation is assumed to be in the clockwise direction as indicated by the arrow shown in FIG. 2. Torque is transmitted from driving shaft 4 to driven shaft 10 as long as rollers 16 of plates 14 remain engaged in slots 6 of flange 2 as shown in FIG. 2. The arrangement is such that the transmission of torque causes moments to be generated about pivots 12 tending to pivot plates 14 about the pivots in a direction which would disengage rollers 16 from slots 6. These moments are augmented by centrifugal force in the configuration shown in the Figure. The aforenoted pivoting is prevented by rod 22 engaging concavities 20 in plates 14 to effect the coupling of shafts 4 and 10 and the aforenoted torque transmission.

Upon displacement of rod 22 in the direction shown by the arrow in FIG. 1, the rod is disengaged from the concavities and plates 14 are rendered free to pivot about pivots 12 in the direction shown by the arrows in FIG. 3, until stops 18 abut flange 8. The device is then in the configuration shown in FIG. 3, with rollers 16 of plates 14 disengaged from slots 6 of flange 2, and the driving and driven shafts being thereupon uncoupled.

In this connection it will be understood that rod 22 may be displaced by solenoid means or the like, either manually actuated upon an indication that uncoupling of the driving and driven members is desirable or necessary, or automatically actuated by sensing means which senses a failure requiring the uncoupling as the case may be.

Further, while a single configuration employing the principles of the invention has been illustrated, other configurations as well as desirable structural refinements are now obvious. For purposes of illustration, means may be provided for maintaining plates 14 in the disengaged position as shown in FIG. 3, and such means may include spring loading or the like as will be readily understood. Thus, although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A drive coupler and uncoupler comprising:

a driving member including a flange;

a driven member including a flange, said flange carrying a pair of pivots;

a pair of plates, each of which is supported by a corresponding pivot;

first means arranged with the plates and the driving member flange for engaging said plates and flange;

displaceable second means;

the plates including means engaged with the second means for maintaining the engagement of the plates and driving member flange and for preventing the plates from pivoting about the pivots, and to thereby couple the driving and driven members; and the second means displaced for being disengaged from the means included in the plates, with the driving action between the driving and driven members pivoting the plates about the pivots so that the first means disengages the plates and driving member flange to uncouple the driving and driven members.

2. A drive coupler and uncoupler as described by claim 1, wherein:

the driving member flange is substantially oblong in shape;

each of the pair of plates is substantially triangular in shape; and the first means arranged with the plates and the driving member flange for engaging said plates and flange includes a recess at each of the opposite ends of the flange and a displaceable member at corresponding corners of the plates, said members being in engagement with corresponding flange recesses for engaging the plates and flange.

3. A drive coupler and uncoupler as described by claim 2, wherein:

the displaceable second means is a longitudinally displaceable rod;

the means included in the plates and engaged with the second means for maintaining the engagement of the plates and driving member flange and for preventing the plates from pivoting about the pivots, and to thereby couple the driving and driven members, includes concavities at corresponding corners of the plates for receiving the longitudinally displaceable rod when said rod is displaced toward the plates.

4. A drive coupler and uncoupler as described by claim 3, wherein:

the longitudinally displaceable rod is displaced away from the plates and the concavities therein, whereupon the driving action between the driving and driven members pivots the plates about the pivots whereupon the displaceable members on the plates are disengaged from the driving member flange recesses to uncouple the driving and driven members.

5. A drive coupler and uncoupler as described by claim 4, wherein:

the plates carry stops for limiting the pivoting of the plates relative to the driven member flange when the driving and driven members are uncoupled.

6. A drive coupler and uncoupler as described by claim 3, wherein:

the driven shaft is hollow;

the rod is longitudinally displaceable within the hollow driven shaft; and the driven shaft, the driving shaft and the rod are coaxial.

7. A drive coupler and uncoupler as described by claim 6, wherein:

each of the plates are supported at corresponding corners by a pivot;

the displaceable plate members are at corresponding corners of the plates opposite the pivot corners;

the plate concavities are at corresponding corners of the plates opposite the displaceable member corners; and the stops are near the pivot corners of the plates.

* * * * *